United States Patent [19]

Biljes

[11] 4,377,180
[45] Mar. 22, 1983

[54] NON-RETURN VALVE FOR PLASTIC INJECTION MOLDING

[75] Inventor: William H. Biljes, Olmsted Falls, Ohio

[73] Assignee: Component Manufacturing & Design, Inc., North Royalton, Ohio

[21] Appl. No.: 205,196

[22] Filed: Nov. 10, 1980

[51] Int. Cl.³ .............................................. B29F 1/04
[52] U.S. Cl. .................................... 137/528; 417/513; 425/562
[58] Field of Search ................ 137/528; 417/511, 513; 425/146, 542, 562, 563, 564

[56] References Cited

U.S. PATENT DOCUMENTS

| | | | |
|---|---|---|---|
| 1,810,121 | 6/1931 | Black | 417/511 |
| 3,558,244 | 1/1971 | Uchiyama | 417/511 |

FOREIGN PATENT DOCUMENTS

| | | | |
|---|---|---|---|
| 2635144 | 9/1978 | Fed. Rep. of Germany | 425/563 |
| 1249159 | 11/1960 | France | 425/562 |
| 52-14659 | 2/1977 | Japan | 425/563 |

Primary Examiner—Robert G. Nilson
Attorney, Agent, or Firm—Edward C. Crist

[57] ABSTRACT

A non-return valve for use in plastic injection molding is disclosed comprising an elongated body having a threaded end for connection to one end of a reciprocating feed screw. A first removable valve seat insert is received over a cylindrical portion on the valve body and is in abutment with a shoulder formed on the body. A second removable valve seat insert is also received over the cylindrical body portion and is axially spaced from the first valve seat by a tubular spacer. A ring-shaped valve member having valve surfaces on each end face thereof is disposed between the first and second valve seat inserts. An anti-rotation pin is mounted in the valve body and extends into a keyway type notch formed into the first valve insert. The axial clamping force developed by the threaded connection between the valve body and the feed screw functions to clamp the valve seat inserts and the tubular spacer into assembly.

8 Claims, 3 Drawing Figures

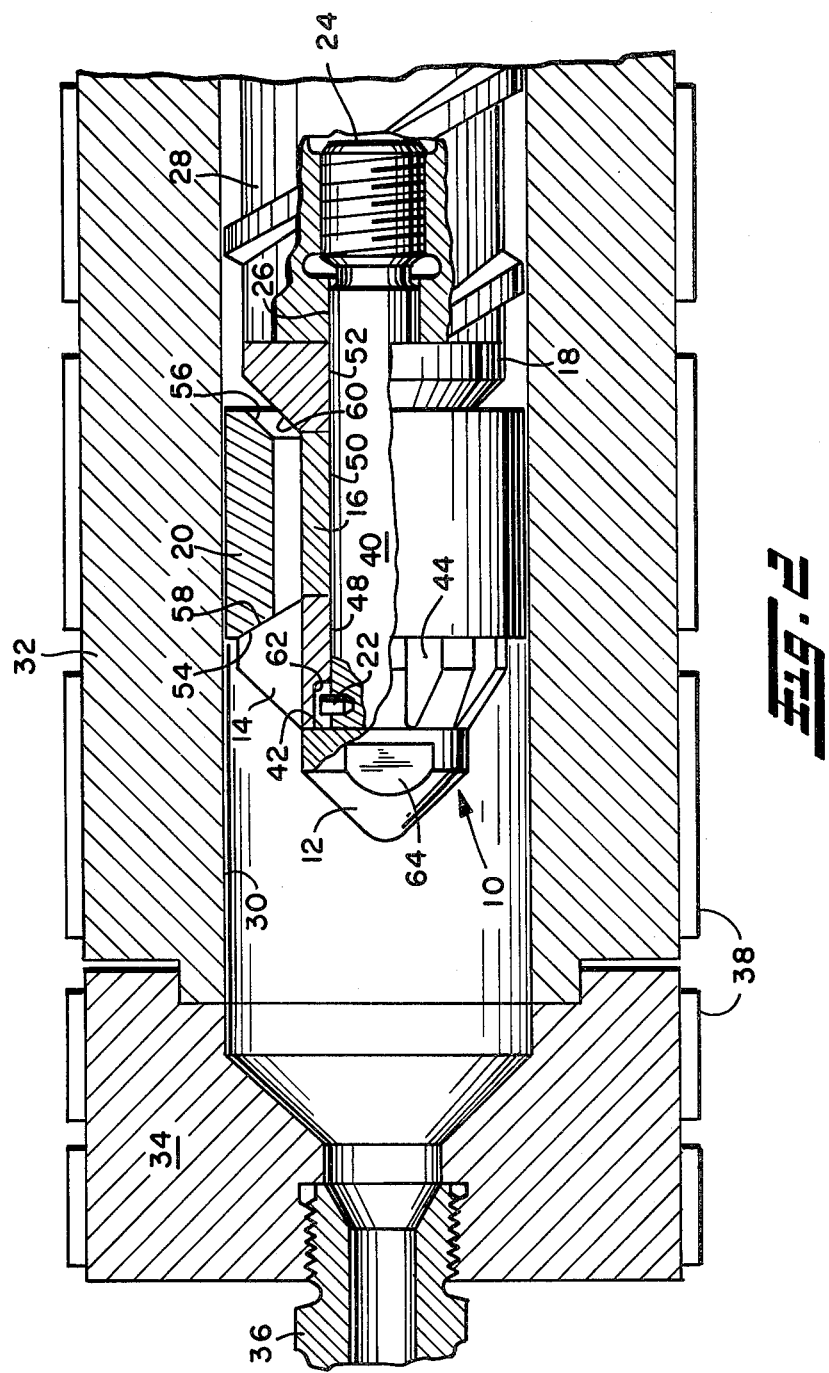

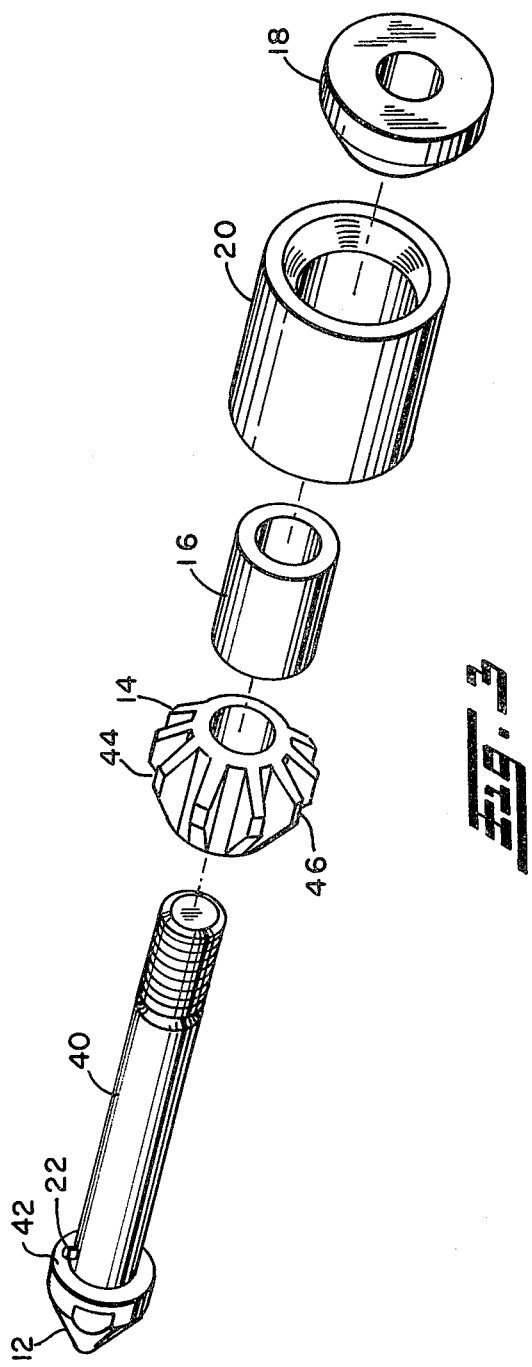

NON-RETURN VALVE FOR PLASTIC INJECTION MOLDING

BACKGROUND OF THE INVENTION

This invention relates generally to non-return or one-way flow valves for valving the flow of molten plastic during the injection molding process and is particularly suited for use in processing highly abrasive types of plastic materials and those materials in which the input of frictional heat due to flow through the valve must be minimized or eliminated.

DESCRIPTION OF THE PRIOR ART

The machinery most commonly used in the injection molding process generally incorporates a reciprocating auger type feed screw mounted in a heated barrel for plasticizing or transforming into a molten state pelletized or granular thermoplastic materials which are fed into one end of the barrel. As is well known in the art, the injection molding process proceeds in two stages, first a plasticizing stage, and second an injection stage.

During the plasticizing stage the feed screw rotates and forces the pelletized polymer material to the forward end of the screw. As the pelletized material flows toward the front of the barrel and screw, it is transformed to a molten state by a combination of frictional heat generated by movement of the plastic against the screw and barrel surfaces and conductive heating transferred through the wall of the barrel from electrical resistance heaters mounted on the exterior of the barrel. Continued rotation of the feed screw results in the molten material or "melt" flowing to the end of the screw where it then enters the non-return valve. As the material is deposited in front of the screw and valve, a differential pressure is developed across the ends of the screw which causes the screw to move toward the feed end of the barrel as it rotates. After a predetermined volume or "shot" of molten plastic is present in front of the screw, the feed screw rotation is stopped by associated controls. At this point the injection stage proceeds by ramming the feed screw forward toward the front end of the barrel, thereby forcing or injecting the shot from the barrel, where it then passes through a nozzle, and into a mold. During injection the non-return valve functions to shut off flow of the shot back toward the screw.

The service conditions imposed upon a one-way valve during injection are extremely severe, being a combination of high pressures in the range of 10,000 to 20,000 lbs. per square inch and temperatures in the range of 300 to 600 degrees F. In addition many of the polymer materials produce corrosive by-products and contain abrasive fillers which attack the one-way valve.

A non-return valve presently in widespread use is a type known in the art as a "check ring valve". A typical prior art check ring valve is shown by FIG. 1 of the drawings. This prior art valve includes a valve body 1, a sliding ring 2, and a valve seat 3. The valve is shown as connected to one end of the feed screw 4 and wherein both the valve and screw are received in a conventional barrel 5. Valve body 1 comprises a stud portion 6 which is received in a threaded bore in one end of the feed screw, a tapered ring seating surface 7, and a plurality of flow passages 8 formed adjacent one end of the valve body. As assembled, valve seat 3 abuts against a shoulder on valve body 1 and also against the end face of screw 4. A tapered seating surface 9 is formed on seat 3. Sliding ring 2 has a tapered seating surface 9 formed on the left or downstream face thereof in a tapered seating surface 10 formed on the right side, or upstream, face thereof. The outer diameter of ring 2 fits closely within barrel 5 and the diametral clearance is sized to substantially prevent the flow of molten plastic material therepast, thus functioning as a sealing surface.

During the plasticizing stage of operation, valve body 1 and seat 3 rotate with screw 4 during which molten plastic is forced between the internal diameter of ring 2 and the valve body and through passages 8 formed in the tip of valve body 1. During this plasticizing stage, ring 2 does not rotate along with valve body 1, but is pulled to the right by the motion of the screw, resulting in tapered surface 9 of the ring rubbing against seating surface 7 on the valve body. During the injection stage of operation the valve screw assembly moves to the left resulting in ring 2 seating against seat 3. Since the screw is not rotating during the injection phase, no sliding wear occurs between tapered surface 10 on the ring in seat 3. However, the sliding of the valve body against the ring during plasticizing results in excessive wear of the ring and the tapered surface 7 of the valve body. After a period of time, the erosion of the valve body around surface 7 is sufficient to allow the ring to slide off the end of the valve. In those prior art valve body configurations having "dead ended" passageways, the flow passages on the end of the body wear away to the extent that material can no longer escape from the end of the valve.

When valve wear has reached this point, both the valve body and the ring must be replaced at considerable expense.

It should be noted that the wear problems described above are especially severe when processing those materials containing fillers such as glass fibers and abrasive mineral compounds.

A requirement in the processing of some plastic materials calls for minimizing or eliminating the amount of frictional heat transferred to the melt due to flow through the valve. It is known tht valves having restrictive cross-sectional flow passageways tend to add heat to the melt due to excessive viscous shear and pressure drops. The amount of restriction through the valve is expressed as the ratio in percentage of the minimum flow area through the valve divided by the flow area at the end of the feed screw times 100%. When this ratio, known as the compression ratio, can be established close to 100%, then frictional heat is minimized. However, even though some prior art valves might have compression ratios approaching 100%, frictional heat inputs still exist, especially in those valves which have a circuitous flow path. A need exists for a valve having a high percentage compression ratio and a relatively unobstructed flow path.

There has also arisen a need for an improved ring type non-return valve assembly which minimizes the cost of valve replacement and which has improved wear life.

SUMMARY OF THE INVENTION

In the present invention a check ring type valve assembly is provided having a novel replaceable downstream seat carried on the valve body. In the preferred form of the invention, the replaceable seat is formed of a suitable high wear resistant material, thus allowing the valve body to be fabricated from a more ductile, tougher material. This enables the valve to more effectively resist twist off of the valve body threaded end from the screw due to high fiscous shear loads from the melt.

The replaceable seat has flow passages formed therethrough and is slidably received over the valve body. A shoulder on the valve body axially locates the replaceable seat. In one embodiment, a radially extending locking pin mounted in the valve body extends into a slot formed into the internal diameter of the replaceable seat for preventing seat rotation. A spacer ring is received over the valve body and abuts against the replaceable seat. A rear valve seat member is also received over the the valve body and is maintained in axial position by abutment against the spacer ring. A sliding ring is positioned between tapered seating surfaces on the replaceable seat and the rear seat.

When the expected life of the replaceable front seat, ring, and/or rear seat have been reached, the valve can be removed from the screw, disassembled, and a new front seat, ring, and rear seat can be installed on the valve body. The valve body and spacer are reuseable indefinitely, thus saving considerable expense since the body generally represents over half the cost of a standard ring valve assembly.

A further feature of the invention is that the replaceable seat can now be fabricated from a suitable highly wear resistant material. Since most highly wear resistant materials are often brittle, they are unsuitable for use in fabricating a standard valve body due to the need for the material possessing good shock resistance. Another drawback associated with the use of special materials, in a standard valve configuration as shown by FIG. 1 is the almost prohibitively high cost.

It is therefore an object of the invention to provide a non-return valve which is highly resistant to wear.

It is another object of the invention to provide a valve assembly which has a highly wear resistant, replaceable front valve seat.

It is another object of the invention to provide a non-return valve which has a free flowing path for molten plastic passing therethrough.

It is a still further object of the invention to provide a non-return valve which has a reuseable valve body.

These and other objects, features, and advantages of the present invention will be understood in greater detail from the following description and the associated drawings wherein reference numerals are utilized in designating a preferred embodiment.

BRIEF DESCRIPTION OF THE DRAWINGS

FIG. 2 is a partial cross-sectional view of a non-return valve embodying the principles of the invention and in association with a feed screw, barrel, barrel end cap, and nozzle (shown partially); and, FIG. 3 is an exploded view in perspective of the valve of FIG. 2.

DETAILED DESCRIPTION

Figure 1:
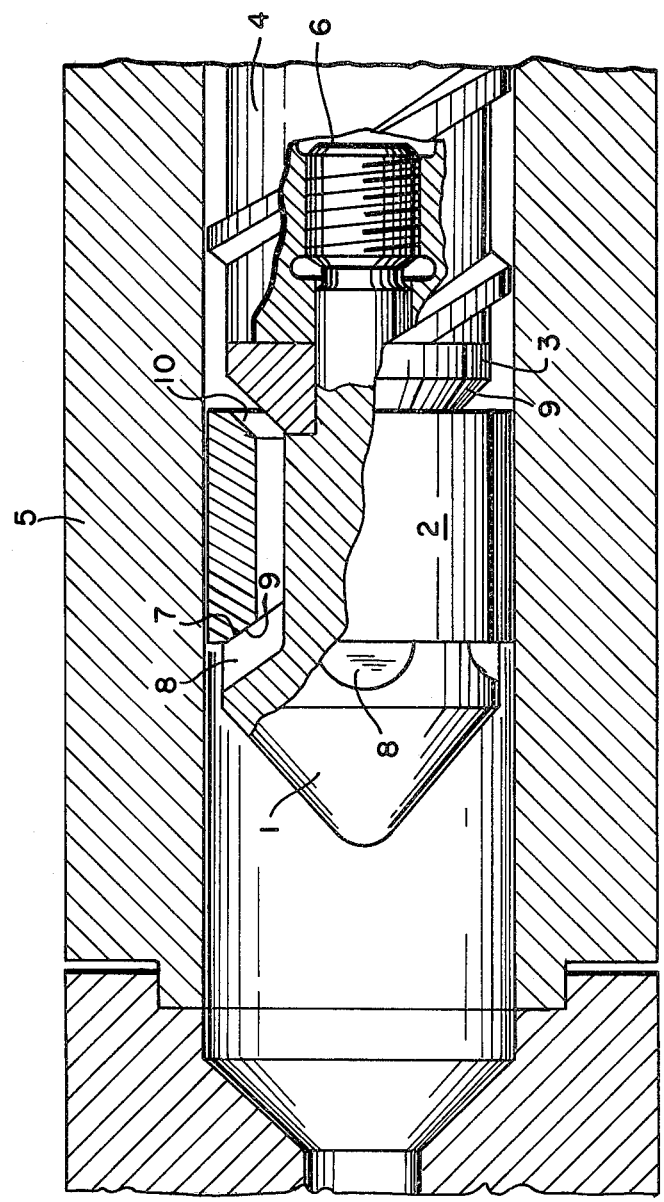
FIG. 1 is a partial cross-sectional view of a prior art ring type non-return valve shown in association with a feed screw and barrel of a conventional injection unit.

Referring now to FIGS. 2 and 3, there is illustrated a non-return valve assembly, indicated generally at 10, embodying the principles of the invention comprising a valve body 12, a replaceable downstream valve seat 14, a spacer ring 16, a rear valve seat 18, a sliding ring 20, and an anti-rotation pin 22. Body 12 includes a threaded end portion 24 and pilot diameter portion 26 which mounts valve 10 to one end of a feed screw 28. Valve 10 and feed screw 28 are shown as mounted within a conventional injection unit comprising a bore 30 defined by a barrel 32. A barrel end cap 34 is mounted on the left end of barrel 32. A nozzle 36 (shown partially) is connected to the end of end cap 34 and functions to transfer processed molten plastic to a mold, not shown. A plurality of heater bands 38 are mounted around the outer surface of barrel 32 and end cap 34. The barrel and screw arrangement which forms part of a standard plastic injection molding machine is well known in the art and is shown merely for illustrative purposes and, as such, forms no part of the invention.

Barrel body 12 includes an elongated cylindrical portion 40 which terminates toward the left end of the valve in a shoulder 42. Pin 22 extends downwardly into cylindrical portion 40 at a position closely adjacent shoulder 42. The left end of valve body 12 is tapered to conform generally to the tapered contour of end cap 34.

Replaceable front valve seat 14 includes a plurality of passageways 44 defined by the space between adjacent radially extending portions 46. A bore 48 extends through seat 14 and is sized for closely fitting sliding relationship with the outer surface of cylindrical portion 40.

Spacer 16 has a bore 50 formed therethrough which is also in closely fitting sliding relationship to cylindrical portion 40. The outer diameter of spacer 16 is preferably sized to blend into the root diameter of passageway 44 to allow for free flow of plastic material through the valve. The functional significance of the flow pattern achieved with this novel configuration will be described in detail below.

Rear seat 18 has a bore 52 formed therethrough which is in closely fitting sliding relationship to the outer diameter of cylindrical section 40.

Ring 20 has tapered valve seating surfaces 54 and 56 formed on the left and right side surfaces thereof which are engageable with corresponding tapered surfaces 58 and 60 formed on front seat 14 and rear seat 18, respectively.

A slot 62 is formed into the surface of bore 48 to a depth and width sufficient to slide over retaining pin 22. Flat surfaces 64 are formed into the front end of valve body 12 and spaced 180 degrees apart for facilitating assembly of valve 10 and disassembly to screw 28. Alternate flat patterns can be used, for example hexagonal or octagonal, to accommodate wrench sockets for valve removal from screw 28.

In the preferred form of the invention, the perpendicular end faces of seats 14 and 18 and spacer 16 are ground square to insure proper part alignment without gaps or suffice discontinuities.

As best shown by FIG. 3, valve 10 is assembled by first sliding downstream seat 14 over the right end of valve body 12 and aligning slot 62 with pin 22 such that seat 14 abuts against shoulder 42. Spacer 16 is then slid over cylindrical section 40 followed by insertion of ring 20 against seat 14. The assembly is completed by sliding rear seat 18 over cylindrical portion 40 and into abutment with spacer 16 thereby capturing sliding ring 20 between tapered surfaces 58 and 60. The valve assembly 10 is then connected to screw 28 by threading stud portion 24 into a mating female thread in the end of screw 28 and tightened snugly until shoulder 42 clamps seat 14, spacer 16, and seat 18 against the end face of screw 28, thus completing assembly of the valve to the screw.

In operation, plasticized molten plastic flows between the space between face 56 on ring 20 and face 60 on seat 18, between the outer diameter of spacer 16 and the inner diameter of ring 20, and through passageways 44 and then to the space in front of valve 10. During this phase of operation, valve 10 is in the open position.

During injection, screw 28 and valve 10 are moved to the left relative to FIG. 2, whereupon tapered surface 56 on ring 20 sealingly engages with tapered surface 60 on front seat 18, thereby preventing a return flow of molten material past valve 10 and back into screw 28.

When seat 14 requires replacement, valve 10 is removed from screw 28 using a wrench applied to flats 64. Seat 14, spacer 16 and rear seat 18 are then pressed from cylindrical portion 40 and a new replacement seat 14 and/or ring 20 are connected to valve body 12 in the manner described above.

In determining the flow area through the valve at any particular point along the valve, the cross-sectional area at the end of screw 28 is first determined. The cross-sectional flow areas through the valve are then adjusted to suit the particular molding application. It should be noted that the relatively straight flow path through the valve provides for a minimization of frictional heat. Material flowing between ring 20 and spacer 16 directly enters the spaces or fluted areas of the front valve seat 14 where it then flows directly over the tapered left end of the valve body.

The embodiment of the invention as shown and described above is representative of the inventive principles stated therein. It is to be understood that variations and departures can be made from the embodiment as shown without, however, departing from the scope of the appended claims.

What is claimed is:

1. A non-return flow valve for valving the flow of molten plastic in a plastic injection molding machine, said machine having a barrel and a reciprocating feed screw mounted in a bore in said barrel, said valve comprising:
   (a) valve body means, said valve body means including,
      (i) means for connecting said body means to said feed screw,
      (ii) a cylindrical body portion,
      (iii) a shoulder portion extending outward radially from said cylindrical body portion, said shoulder portion spaced axially from said connecting means, said cylindrical body portion disposed intermediate said shoulder portion and said connecting means;
   (b) first valve seat means slidably received over said cylindrical body portion, said first valve seat means including means defining:
      (i) a first valve seating surface,
      (ii) a plurality of flow passageway means formed in said first valve seat means, said flow passageway means in fluid communication with said first valve seating surface at the inlet end thereof, and,
      (iii) a generally transverse surface portion in abutment with said shoulder portion;
   (c) a second valve seat means slidably received over said cylindrical portion, said second valve seat means including means defining,
      (i) a transverse surface portion engageable with said feed screw,
      (ii) a second annular valve seating surface disposed axially opposite said transverse surface;
   (d) a tubular spacer slidably received over said cylindrical portion, said spacer disposed intermediate said first and second valve seat means for establishing a predetermined spacing between said first and second valve seating surfaces;
   (e) an annular valve member received over said body means, said valve member having,
      (i) an outer cylindrical surface portion adapted for closely fitting, sliding relationship with said barrel bore,
      (ii) a first annular valve surface formed on one end face thereof,
      (iii) a second annular valve surface formed on the other end face thereof, said second valve surface disposed opposite said first valve surface,
      (iv) said first and second valve surfaces longitudinally spaced an amount less than said predetermined spacing between said first and second valve seating surfaces,
      (v) an inner cylindrical surface portion having an internal diameter greater than the outer diameter of said tubular spacer for defining an annular fluid passageway therebetween;
   (f) anti-rotation means for preventing rotation of said first valve seat means relative to said valve body means, said anti-rotation means including,
      (i) a radially extending pin having a first portion thereof mounted in a bore in said cylindrical body portion and a second portion thereof extending outwardly therefrom,
      (ii) said first annular valve seat means has a cylindrical bore formed therethrough and in closely fitting relationship to said cylindrical body portion, and an axially extending notch formed into said cylindrical surface portion adjacent said transverse surface portion, said second portion of said pin extending into said notch; and
   (g) said valve member movable between an open position in which said first valve surface is in abutment with said first valve seating surface in which molten plastic flows from said feed screw between said second valve surface and said second annular valve seating surface, through said annular passageway, and exhausting through said flow passageways in said first valve seat means exteriorly of said one-way flow valve, said valve member movable to a closed position in which said second valve surface is in sealing abutment with said second valve seating surface such that said molten plastic is prevented from flowing toward said feed screw.

2. The valve as defined in claim 1, wherein,
   (a) said tubular spacer has an outer cylindrical surface of a predetermined outer diameter;
   (b) said plurality of flow passageway means in said first valve seat means are each defined by the spaces between a plurality of radially outwardly extending and circumferentially spaced portions; and,
   (c) said first valve seat means having a root diameter portion between adjacent radial portions subdtantially equal to the outer diameter of said tubular spacer.

3. The valve as defined in claim 1, wherein said first valve seat means includes an annular member having a tubular portion and a plurality of radially outwardly extending, circumferentially spaced portions, said first valve seating surface formed by the end faces of each of said radially extending portions, said plurality of flow passageway means defined by the spaces between adjacent said radially extending portions.

4. A non-return flow valve for valving the flow of molten plastic in a plastic injection molding machine, said machine having a barrel and a reciprocating feed screw mounted in a bore in said barrel, said valve comprising:
 (a) valve body means, said valve body means including,
  (i) means for connecting said body means to said feed screw,
  (ii) a cylindrical body portion,
  (iii) a shoulder portion extending outward radially from said cylindrical body portion, said shoulder portion spaced axially from said connecting means, said cylindrical body portion disposed intermediate said shoulder portion and said connecting means;
 (b) first valve seat means slidably received over said cylindrical body portion, said first valve seat means having,
  (i) a tubular portion,
  (ii) a plurality of circumferentially spaced, radially extending portions projecting from said tubular portion,
  (iii) first valve seating surfaces formed by the end faces of said radially extending portions,
  (iv) a generally transverse surface portion in abutment with said shoulder portion;
 (c) a second valve seat means slidably received over said cylindrical portion, said second valve seat means including means defining,
  (i) a transverse surface portion engageable with said feed screw,
  (ii) a second annular valve seating surface disposed axially opposite said transverse surface;
 (d) a tubular spacer slidably received over said cylindrical portion, said spacer disposed intermediate said first and second valve seat means for establishing a predetermined spacing between said first and second valve seating surfaces;
 (e) said tubular spacer, said first valve seat means, and said valve body means shoulder portion defining a substantially straight flow channel therealong;
 (f) an annular valve member received over said body means, said valve member having,
  (i) an outer cylindrical surface portion adapted for closely fitting, sliding relationship with said barrel bore,
  (ii) a first annular valve surface formed on one end face thereof,
  (iii) a second annular valve surface formed on the other end face thereof, said second valve surface disposed opposite said first valve surface,
  (iv) said first and second valve surfaces longitudinally spaced an amount less than said predetermined spacing between said first and second valve seating surfaces,
  (v) an inner cylindrical surface portion having an internal diameter greater than the outer diameter of said tubular spacer for defining an annular fluid passageway therebetween; and
 (g) said valve member movable between an open position in which said first valve surface is in abutment with said first valve seating surface in which molten plastic flows from said feed screw between said second valve surface and said second annular valve seating surface, through said annular passageway, through said flow channel, and exhausting through said flow passageways in said first valve seat means exteriorly of said one-way flow valve, said valve member movable to a closed position in which said second valve surface is in sealing abutment with said second valve seating surface such that said molten plastic is prevented from flowing toward said feed screw.

5. The valve as defined in claim 4, further including anti-rotation means for preventing rotation of said first valve seat means relative to said valve body means.

6. The valve as defined in claim 4, wherein said anti-rotation means includes,
 (a) a radially extending pin having a first portion thereof mounted in a bore in said cylindrical body portion and a second portion thereof extending outwardly therefrom; and
 (b) said first annular valve seat means has a cylindrical bore formed therethrough and in closely fitting relationship to said cylindrical body portion, and an axially extending notch formed into said cylindrical surface portion adjacent said transverse surface portion, said second portion of said pin extending into said notch.

7. The valve as defined in claim 4, wherein,
 (a) said tubular spacer has an outer cylindrical surface of a predetermined outer diameter;
 (b) said first valve seat means having a root diameter portion between adjacent radial portions substantially equal to the outer diameter of said tubular spacer; and
 (c) said valve body means shoulder portion having an outer diameter portion substantially equal to the outer diameter of said tubular spacer.

8. The valve as defined in claim 4, wherein said first valve seat means is formed of a material substantially harder than the material of said valve body.

* * * * *